(12) United States Patent
Bour

(10) Patent No.: US 9,498,841 B2
(45) Date of Patent: Nov. 22, 2016

(54) AUXILIARY DEVICE FOR WELDING SPINDLE DISKS, HAVING A DAMPING BELT, AND FRICTION WELDING METHOD

(71) Applicant: SNECMA, Paris (FR)

(72) Inventor: Jean-Luc Bour, Guyancourt (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/763,287

(22) PCT Filed: Jan. 29, 2014

(86) PCT No.: PCT/FR2014/050157
§ 371 (c)(1),
(2) Date: Jul. 24, 2015

(87) PCT Pub. No.: WO2014/118464
PCT Pub. Date: Aug. 7, 2014

(65) Prior Publication Data
US 2015/0343556 A1    Dec. 3, 2015

(30) Foreign Application Priority Data

Jan. 31, 2013  (FR) ..................................... 13 50843

(51) Int. Cl.
*B23K 20/12*     (2006.01)
*B23K 20/00*     (2006.01)
*B23K 37/04*     (2006.01)
*B23K 37/053*    (2006.01)
*F01D 5/06*      (2006.01)
*F01D 25/28*     (2006.01)
*F01D 5/30*      (2006.01)

(52) U.S. Cl.
CPC ......... *B23K 20/1255* (2013.01); *B23K 20/002* (2013.01); *B23K 20/12* (2013.01); *B23K 37/0443* (2013.01); *B23K 37/0533* (2013.01); *F01D 5/063* (2013.01); *F01D 25/285* (2013.01); *B23K 2201/001* (2013.01); *F01D 5/3007* (2013.01); *F05D 2230/239* (2013.01)

(58) Field of Classification Search
CPC .......... Y10T 29/4932; B23K 20/1205; B23K 2201/001; B23K 20/12; B23K 20/129
USPC ................................ 228/112.1, 113, 114, 2.1
See application file for complete search history.

(56) References Cited

U.S. PATENT DOCUMENTS

2006/0051211 A1    3/2006  Ferte

OTHER PUBLICATIONS

International Search Report issued May 9, 2014 in PCT/FR2014/050157 filed Jan. 29, 2014.
French Search Report issued Oct. 24, 2013 in FR 1350843 filed Jan. 31, 2013.

*Primary Examiner* — Erin Saad
(74) *Attorney, Agent, or Firm* — Oblon, McClelland, Maier & Neustadt, L.L.P

(57) ABSTRACT

A belt including notches alternating with bushings on its inside surface is arranged around a disk, so as to encase it and to squeeze its periphery, the bushings penetrating into slot necks designed to house blade roots, so as to apply an elastic tightening force on the teeth and prevent fatigue cracks from forming during inertial friction welding of the disk with other parts of the rotor, these cracks possibly appearing at fillet connections of the teeth to the central part of the disk. The belt is made from elastic polymer with good internal viscosity, and damping properties.

2 Claims, 3 Drawing Sheets

AUXILIARY DEVICE FOR WELDING SPINDLE DISKS, HAVING A DAMPING BELT, AND FRICTION WELDING METHOD

BACKGROUND OF THE INVENTION

Field of the Invention

A first aspect of the invention is related to an auxiliary device for welding broached disks comprising a damping belt and another aspect is related to an associated friction welding method.

Description of the Related Art

Turbojet and turboprop disks are frequently friction welded to each other and particularly by inertial friction in assembly planes perpendicular to the rotation axis of the rotor thus created. They frequently comprise broached slots around their periphery inside which blade roots and possibly blade retaining hooks located at the ends of the slots will be fitted.

This welding method uses very high energy and almost always produces high intensity and high frequency vibrations. Fatigue cracks may then appear at the bottom of the slots, and at the bottom of the blade retaining hooks.

These disadvantages of friction welding are already well known and it has been proposed that they can be corrected by associating elements for damping of these vibrations to the parts to be welded. Documents US 2004/108358 A and 2010/193 572 A disclose a few examples. However, it would seem that the damping devices according to these patents are not adapted to the special case of disks with peripheral slots and do not prevent the development of cracks by vibration fatigue at the most exposed locations, namely at the fillet connections between the peripheral teeth separating the slots and the main part of the disk starting at the bottom of the slots, and at the bottom of the blade retaining hooks. US 2006/051211 discloses a more complex damping element than the element according to the invention comprising two side polymer belts held between two metal end plates, that are brought towards each other to keep the belts on the side faces of the disk. The damping element described in this prior document certainly relates to a disk to be friction welded, but this disk has no broached slots separated by teeth to contain blade roots, because the disk disclosed in this prior document is a single-piece blisk that already carries blades.

BRIEF SUMMARY OF THE INVENTION

The invention was designed to provide a device for protection of broached slots in disks by damping vibrations, adapted to disks with peripheral slots.

According to the invention, the new device comprises a viscoelastic polymer circular belt, the belt comprising an alternation of bushings and notches, characterised in that the belt comprises a bandage to be arranged tightly around the periphery of the disk, and the bushings and the notches are on the inside face of the bandage.

The belt and its bushings partially surround the teeth of the disk and limit the amplitude of their vibrations, particularly because the bushings that are squeezed between adjacent pairs of teeth contribute to applying in-phase vibration modes to the teeth, that therefore reduce the high frequencies while reducing the amplitude of vibrations due to the damping properties of their materials. The role of the closed circular bandage that surrounds the disk with a radial restraint is important and contributes to damping. Unlike the device in US 2006/051211, it is a single piece device and therefore easy to make and to use. It is also lighter in weight, partly because there are no metal end plates necessary to keep the side belt in contact with the disk and that can have a high inertia that makes damping more difficult.

According to one improvement, the belt comprises side skirts that project in the inwards radial direction. They contribute to holding the belt in position during the welding process while reducing vibrations applied to the blade retaining hooks when there are any. At the same time, these side skirts protect the finished surfaces of broached slots from micro-splashes related to the weld.

The polymer must have sufficient elasticity and flexibility so that it can be arranged around the disk tightly, and then removed from the disk without residual deformation. Ideally, it must also have sufficient damping properties to efficiently reduce the vibration amplitude. Polyurethanes may be proposed.

The invention also relates to a method for friction welding a broached disk, characterised in that it consists of using the auxiliary device as described above, adjusting it to be tight around the disk, the bushings penetrating into slots formed around the periphery of the disk such that they are compressed between the teeth of the disk alternating with the slots during welding.

According to one optional and advantageous characteristic, the radius of the belt is less than the outside radius of the disk, such that it is 3 to 20% smaller than the disk when it is separated from it.

BRIEF DESCRIPTION OF THE SEVERAL VIEWS OF THE DRAWINGS

Different aspects of the invention will now be described with reference to the following figures that are appended and are given purely for illustrative purpose and describe one possible embodiment of the invention.

DETAILED DESCRIPTION OF THE INVENTION

Figure 1:
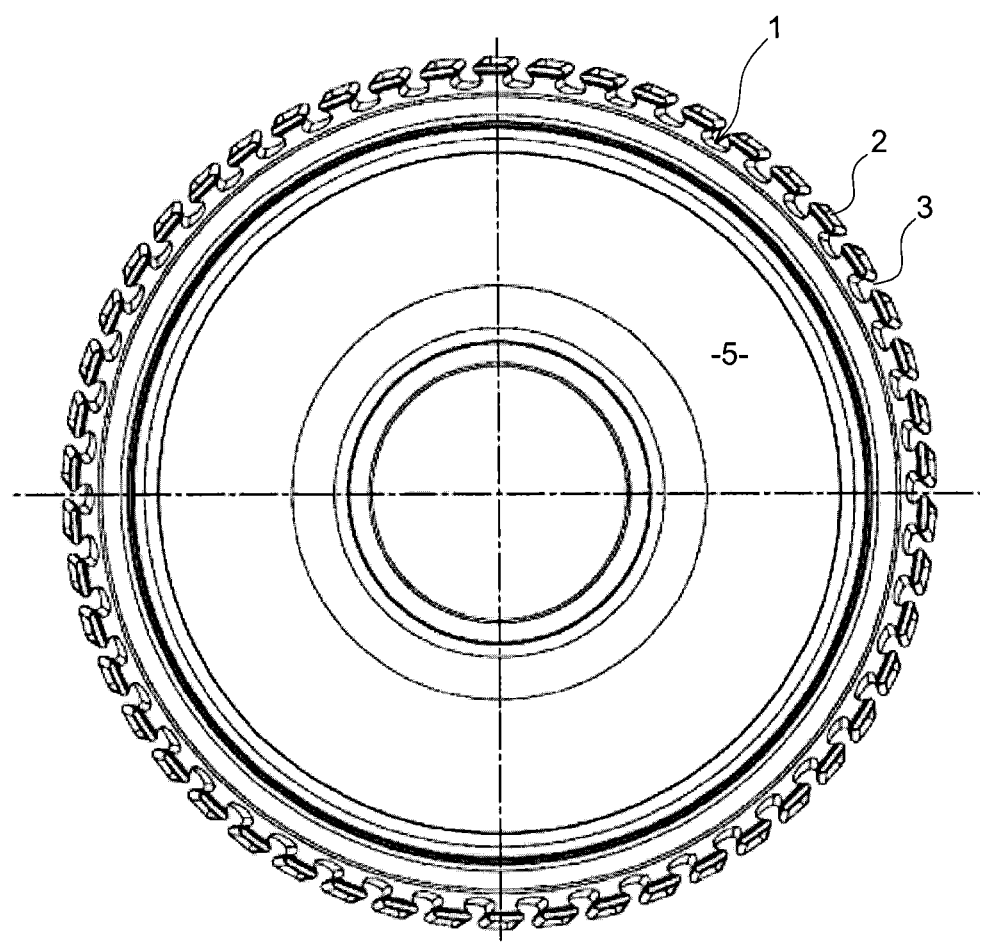
FIG. 1 is an overview of the disk to which the invention can be applied.

Refer to FIG. 1. The disk to which the invention can be applied comprises a periphery around which slots 1 alternate with solid portions in this case called teeth 2. The slots 1 form a widened base nearest the centre of the disk and a narrower upper part forming a neck 3. Broaches may be fitted in the slots 1 longitudinally or obliquely; hooks may also be fitted on end faces of the teeth 2 and later retain disk blades, the roots of which slide into the slots 1 and the ends of which will be fitted with complementary hooks; rings will be inserted into the hooks 4 of the teeth 2 and into the hooks of the blade roots to retain blades along the slots 1. This arrangement is known and is not shown.

With this disk shape, the cracks may appear at fillet connections 6 between the teeth 2 and the main portion 5 of the disk, central and continuous, initiating on the sides of these fillet connections 6 and precisely at the locations opening up at the bottom of the slots 1 where the teeth 2 are the narrowest, and at the fillet connections between the hooks 4 and the teeth 2.

Figure 2:
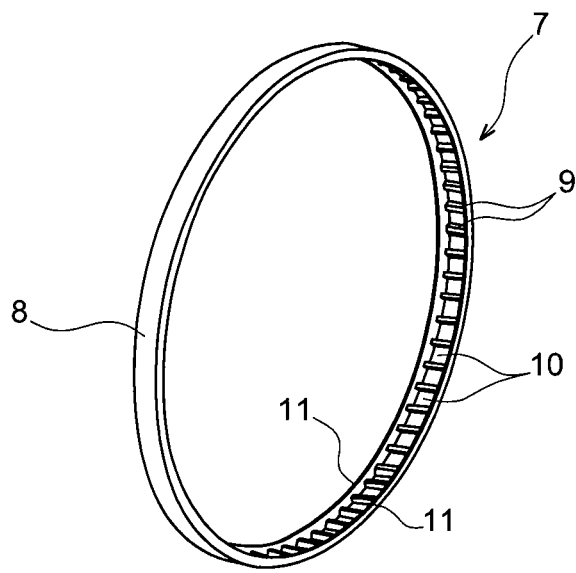
FIG. 2 is an overview of the belt in the free state.
Figure 3:
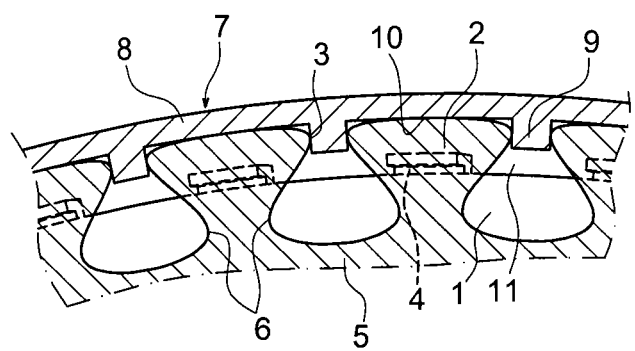
FIG. 3 is a detailed view of the disk fitted with the belt.

A damping belt 7 shown in FIG. 2 can be used in accordance with the invention during welding. It is made of polymer and is sufficiently viscoelastic to be flexible, elastic and strongly damp vibrations. It comprises a bandage 8 arranged around the periphery of the disk, bushings 9 separated by notches 10 on its inner face and side skirts 11 on the two sides of the bandage 8 that are flat strips that project radially inwards. The bushings 9 penetrate between the teeth 2 so as to fill in the necks 3.

The bandage 8 is pressed onto the teeth 2 with a restraint force that depends on its expansion when it is arranged around the teeth 2. The bushings 9 are compressed between adjacent teeth and contribute to holding it in place and clamping it in the tangential direction, which makes it more difficult for the teeth 2 to bend. The skirts 11 help to hold the belt 7 in position around the disk during welding, and also apply pressure and damping on the hooks 4.

Since the teeth 2 do not bend as easily around their fillet connection to the main part 5 of the disk, the filet connections 6 are less highly stressed and fatigue cracks do not appear in them, or develop much less easily.

The belt 7 is advantageously made of polyurethane. Courbhane 60R (registered trade mark) is a grade providing characteristics, especially damping characteristics, that are quite suitable for the invention.

It has been found that good damping results were obtained with a bandage 8 for which the radius of the inside face in the unstressed state is 3% to 20% smaller than the outside radius of the disk (radii being measured at the locations of the notches 10 and the teeth 2).

Figure 4:
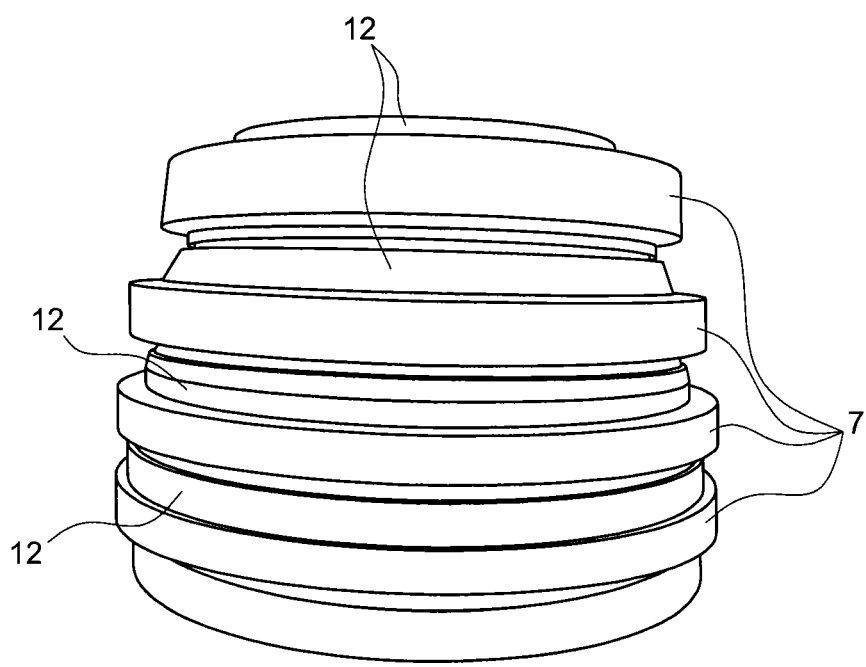
FIG. 4 is an overview of the rotor assembly according to the invention.

FIG. 4 shows the use of belts 7, in this case several of them are arranged on the same number of disks 12 that are already assembled to each other, but these belts are left in position as long as other disks, not shown, need to be welded to the previously obtained assembly.

Welding is done in general, according to the state of known art.

The invention claimed is:

1. A friction welding method for welding a broached disk, the disk comprising slots for receiving blade roots, said method comprising:
    welding with an auxiliary device comprising a viscoelastic polymer circular belt, the belt comprising an alternation of bushings and notches, the belt comprising a bandage to be arranged tightly around a periphery of the disk by a radial restraint of the bandage, and the bushings and the notches are on an inside face of the bandage, the bandage being closed and circular, the bandage being tightly adjusted around the disk, the bushings penetrating into the slots formed around the periphery of the disk, such that the bushings are compressed between teeth of the disk alternating with the slots, during welding.

2. A welding method according to claim 1, wherein when the belt is in a free state, an inside radius of the belt is 3% to 20% smaller than the outside radius of the disk.

* * * * *